United States Patent
Ito et al.

(10) Patent No.: US 8,065,473 B2
(45) Date of Patent: Nov. 22, 2011

(54) METHOD FOR CONTROLLING MEMORY CARD AND METHOD FOR CONTROLLING NONVOLATILE SEMICONDUCTOR MEMORY

(75) Inventors: Takafumi Ito, Ome (JP); Hiroyuki Sakamoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/813,164

(22) Filed: Jun. 10, 2010

(65) Prior Publication Data

US 2010/0250839 A1  Sep. 30, 2010

Related U.S. Application Data

(60) Division of application No. 11/589,090, filed on Oct. 30, 2006, which is a continuation of application No. PCT/JP2005/011396, filed on Jun. 15, 2006.

(30) Foreign Application Priority Data

Jun. 21, 2004 (JP) .................. 2004-182866

(51) Int. Cl.
*G06F 13/00* (2006.01)
(52) U.S. Cl. ................ 711/103; 711/E12.006
(58) Field of Classification Search .......... 711/103, 711/703, E12.006
See application file for complete search history.

(56) References Cited

U.S. PATENT DOCUMENTS

| | | | |
|---|---|---|---|
| 5,652,865 A * | 7/1997 | Rawlings, III ............. 711/171 |
| 5,742,793 A * | 4/1998 | Sturges et al. ............. 711/152 |
| 5,838,614 A | 11/1998 | Estakhri et al. | |
| 6,609,187 B1 | 8/2003 | Merrell et al. | |
| 2003/0026186 A1 | 2/2003 | Ando et al. | |
| 2003/0028717 A1 | 2/2003 | March et al. | |
| 2004/0098427 A1 * | 5/2004 | Peng ............................. 707/205 |
| 2008/0098161 A1 | 4/2008 | Ito | |
| 2008/0172427 A1 | 7/2008 | Ito et al. | |
| 2009/0248963 A1 | 10/2009 | Ito | |
| 2010/0023721 A1 | 1/2010 | Ito | |

FOREIGN PATENT DOCUMENTS

| | | |
|---|---|---|
| JP | 7-56780 | 3/1995 |
| JP | 7-64831 | 3/1995 |
| JP | 7-98992 | 4/1995 |
| JP | 7-141479 | 6/1995 |

(Continued)

OTHER PUBLICATIONS

Tsunoru Nakajima, Recording DVD Drive, Recording DVD Drive is Becoming Widespread, Selecting a Drive According to the Purpose, Nikkei inux, Japan, Nikkei BP, vol. 5, $3^{rd}$ issue, Mar. 8, 2003, pp. 18-22.

*Primary Examiner* — Hetul Patel
(74) *Attorney, Agent, or Firm* — Oblon, Spivak, McClelland, Maier & Neustadt, L.L.P.

(57) ABSTRACT

A method for controlling a memory card which includes a nonvolatile semiconductor memory whose memory area includes a plurality of write areas is disclosed. A first area which is a part of the plurality of write areas is set in accordance with management executed by a first file system. The first file system sequentially writes data along a direction in which addresses of the plurality of write areas increase. A second area which is a part of the plurality of write areas is set in accordance with management executed by a second file system. The second file system writes data in an order which does not depend on the addresses.

18 Claims, 9 Drawing Sheets

FOREIGN PATENT DOCUMENTS

| | | |
|---|---|---|
| JP | 9-97218 | 4/1997 |
| JP | 9-265427 | 10/1997 |
| JP | 2000-267904 | 9/2000 |
| JP | 2002-163139 | 6/2002 |
| JP | 2004-30232 | 1/2004 |
| WO | WO 2004/040577 A | 5/2004 |

* cited by examiner

| LBN | Descriptor | Structure |
|---|---|---|
| 0 - 79 | Space bitmap descriptor | Space bitmap |
| 80 | File set descriptor | File identification descriptor |
| 81 | Terminal descriptor | |
| 82 | File entry (root directory) | Root ICB |
| 83 | File identification descriptor (parent directory) | Root directory |
| | File identification descriptor (DIR_1) | |
| | File identification descriptor (DIR_2) | |
| 84 | File entry (DIR_1) | DIR_1_ICB |
| 85 | File identification descriptor (parent directory) | DIR_1 directory |
| | File identification descriptor (DIR_1_1) | |
| | File identification descriptor (DIR_1_2) | |
| | File identification descriptor (DIR_1_3) | |
| | File identification descriptor (DIR_1_4) | |
| | File identification descriptor (DIR_1_5) | |
| | File identification descriptor (DIR_1_6) | |
| | File identification descriptor (DIR_1_7) | |
| | File identification descriptor (DIR_1_8) | |
| 86 | File entry (DIR_1_1) | DIR_1 file ICB |
| 87 | File entry (DIR_1_2) | |
| 88 | File entry (DIR_1_3) | |
| 89 | File entry (DIR_1_4) | |
| 90 | File entry (DIR_1_5) | |
| 91 | File entry (DIR_1_6) | |
| 92 | File entry (DIR_1_7) | |
| 93 | File entry (DIR_1_8) | |
| 94 | File entry (DIR_2) | DIR_2_ICB |
| 95 | File identification descriptor (parent directory) | DIR_2 directory |
| | File identification descriptor (DIR_2_1) | |
| | File identification descriptor (DIR_2_2) | |
| | File identification descriptor (DIR_2_3) | |
| | File identification descriptor (DIR_2_4) | |
| | File identification descriptor (DIR_2_5) | |
| 96 | File entry (DIR_2_1) | DIR_1 directory |
| 97 | File entry (DIR_2_2) | |
| 98 | File entry (DIR_2_3) | |
| 99 | File entry (DIR_2_4) | |
| 100 | File entry (DIR_2_5) | |

METHOD FOR CONTROLLING MEMORY CARD AND METHOD FOR CONTROLLING NONVOLATILE SEMICONDUCTOR MEMORY

CROSS-REFERENCE TO RELATED APPLICATIONS

This is a Divisional Application of U.S. Ser. No. 11/589,090 filed Oct. 30, 2006, which is a Continuation Application of PCT Application No. PCT/JP2005/011396, filed Jun. 15, 2005, which was published under PCT Article 21(2) in English, the entire contents of which are incorporated herein by reference.

This application is based upon and claims the benefit of priority from prior Japanese Patent Application No. 2004-182866, filed Jun. 21, 2004, the entire contents of which are incorporated herein by reference.

BACKGROUND OF THE INVENTION

1. Field of the Invention

The present invention relates to a method for controlling a memory card and a method for controlling a nonvolatile semiconductor memory, and in particular, to a method for controlling a nonvolatile semiconductor memory having a predetermined erase block size.

2. Description of the Related Art

Memory cards using a nonvolatile memory such as a flash memory are now used as recording media for music or video data. A FAT system is used as a file system for the memory card. Jpn. Pat. Appln. KOKAI Publication No. 7-141479 discloses an example in which the FAT system is adopted as a file system for a flash memory. The FAT file system is originally used for a medium such as a hard disk on which high-speed, random rewrite operations can be performed. The random write operation is a method of random writing data in free sectors regardless of their addresses (the sectors are write area units that the file system recognizes).

A typical example of a flash memory used for a memory card is a NAND type flash memory. Data in the NAND type flash memory can be erased only in block units. One block contains pages that are write units. Thus, to rewrite only a part of the data stored in a block, it is necessary to write a new write data to a new erased block and to copy data, which are not to be rewritten, from the old block containing the old data (that are to be changed to new data) to the new block. This process is called "move accompanying write (involved data copy)". The move accompanying write involves an operation of copying data that is not to be rewritten. Consequently, frequent move accompanying write operations drastically increase overhead.

With a FAT file system, every operation of rewriting cluster data in a file requires FAT data to be rewritten. Thus, if the FAT file system is adopted as a file system to manage a NAND type flash memory, every operation of rewriting cluster data results in a move accompanying write. This reduces file rewrite speed.

BRIEF SUMMARY OF THE INVENTION

According to a first aspect of the present invention, there is provided a method for controlling a memory card which includes a nonvolatile semiconductor memory whose memory area includes a plurality of write areas, the method comprising: setting a first area which is a part of the plurality of write areas in accordance with management executed by a first file system which sequentially writes data along a direction in which addresses of the plurality of write areas increase; and setting a second area which is a part of the plurality of write areas in accordance with management executed by a second file system which writes data in an order which does not depend on the addresses.

According to a second aspect of the present invention, there is provided a method for controlling a nonvolatile semiconductor memory whose memory area includes a plurality of write areas, the method comprising: using a first control method to control the nonvolatile semiconductor memory when writing or reading data to or from a first area which is a part of the plurality of write areas, the first area being set in accordance with management executed by a first file system which sequentially writes data along a direction in which addresses of the plurality of write areas increase; and using a second control method to control the nonvolatile semiconductor memory when writing or reading data to or from a second area which is a part of the plurality of write areas, the second area being set in accordance with management executed by a second file system which writes data in an order which does not depend on the addresses.

According to a third aspect of the present invention, there is provided a method for controlling a nonvolatile semiconductor memory having a plurality of write areas each having a data storage section which stores data and a written state information section which indicates a written state or a free state, the method comprising: sequentially writing data in the plurality of write areas in a direction in which addresses of the plurality of write areas increase, while writing data in the data storage section of one of the plurality of write areas and writing a written state indication in the written state information section.

According to a fourth aspect of the present invention, there is provided a method for controlling a nonvolatile semiconductor memory whose memory area includes a plurality of write areas, the method comprising: receiving a data moving command containing an instruction on movement of data stored in one of the plurality of write areas to another one of the plurality of write areas; and executing a process specified by the data moving command by at least either actually moving data using a data copy command and a write area erase command or using a conversion table for conversions between addresses of the plurality of write areas where move target data is stored and addresses of the plurality of write areas where the move target data is to be stored to make an issuer of the data moving command consider that data is moved.

According to a fifth aspect of the present invention, there is provided a method for controlling a memory card which includes a nonvolatile semiconductor memory whose memory area includes a plurality of write areas, the method comprising: creating a temporary file entry describing a size of an reserved region which is at least a free part of the plurality of write areas and a start position of the reserved region; writing a file consisting of a plurality of data in the reserved region from the start position; and when the file has been completely written, determining a size of the file written; and changing the temporary file entry to a file entry describing the start position and the size of the file.

DETAILED DESCRIPTION OF THE INVENTION

Embodiments of the present invention will be described below with reference to the drawings.

[1] Configuration

Figure 1:
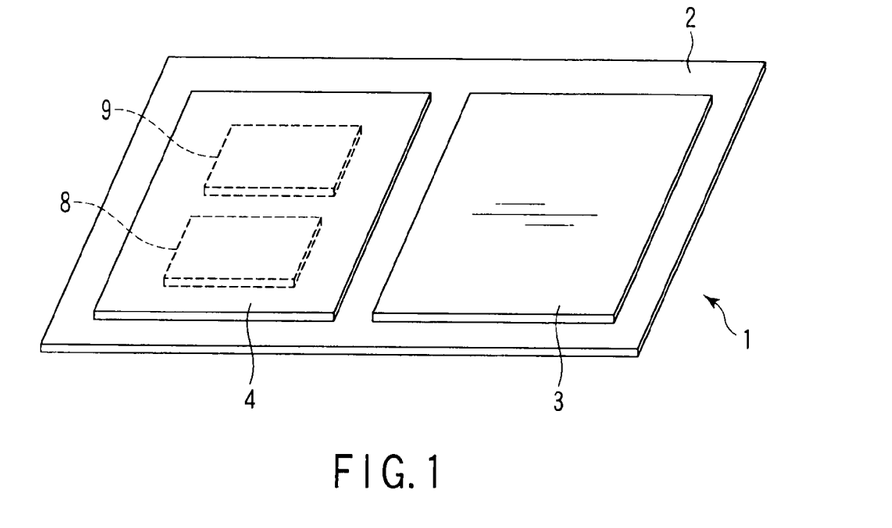
FIG. 1 is a perspective view schematically showing the configuration of devices mounted in a memory card according to an embodiment of the present invention.

FIG. 1 is a perspective view schematically showing the configuration of devices mounted in a memory card according to an embodiment of the present invention.

A memory card 1 has a printed circuit board (PCB) 2, and a NAND type flash memory 3 and a controller 4 which are arranged on the PCB 2. Functional blocks such as a central processing unit (CPU) 8 and a read-only memory (ROM) 9 are mounted in the controller 4. These devices will be described later in detail.

The NAND type flash memory (referred to as a flash memory below) 3 may be a binary memory that stores 1-bit information in one memory cell or a multivalued memory that stores 2-or-more-bit information in one memory cell. In contrast to the example shown in FIG. 1, the flash memory 3 and the controller 4 may be arranged on the same large-scale integration (LSI) substrate.

Figure 2:
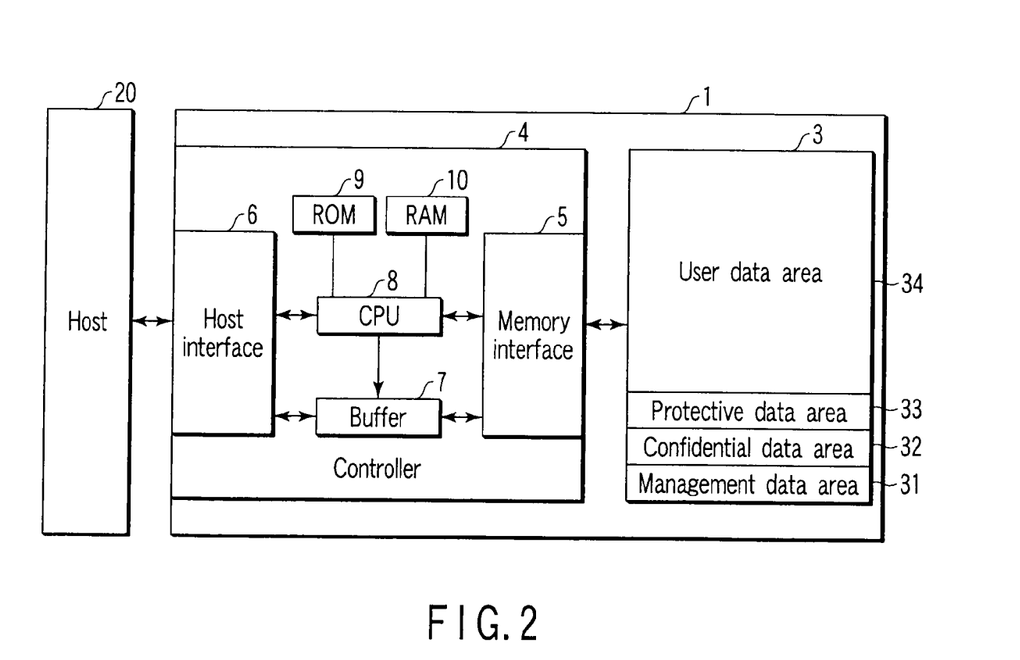
FIG. 2 is a block diagram showing a configuration including a host apparatus and the memory card.

FIG. 2 is a block diagram showing a configuration including a host apparatus and the memory card. Elements common to FIGS. 1 and 2 are denoted by the same reference numerals.

The host apparatus (referred to as a host below) 20 comprises hardware and software (system) used to make accesses to the inserted memory card 1.

When connected to the host 20, the memory card 1 is supplied with power to operate and execute a process corresponding to an access from the host 20. The memory card 1 has the NAND type flash memory 3 and controller 4 as previously described.

The flash memory 3 is a nonvolatile semiconductor memory for which the size of each erase unit (block) is specified as 256 kB and which writes and reads, for example, every 16-kB data. The flash memory 3 is manufactured using, for example, a 0.09-μm process technique. That is, a design rule for the flash memory 3 is less than 0.1 μm.

The controller 4 has a function for managing the internal physical state of the flash memory 3 (the physical address and ordinal number of sector address data in the flash memory 3 or what block is in an erased state). In addition to CPU 8 and ROM 9, a memory interface section 5, a host interface section 6, a buffer 7, and random access memory (RAM) 10 are mounted in the controller 4.

The memory interface section 5 executes an interface process between the controller 4 and the flash memory 3. The host interface section 6 executes an interface process between the controller 4 and the host 20.

The buffer 7 temporarily stores a fixed amount of data (for example, one page) when data transmitted by the host 20 is written to the flash memory 3 and when data read from the flash memory 3 is transmitted to the host 20.

The CPU 8 is responsible for operations of the whole memory card 1. When, for example, the memory card 1 is powered on, the CPU 8 loads firmware (control program described later) stored in ROM 9, into RAM 10 to execute a predetermined process. In accordance with a control program, CPU 8 creates various tables (described later) on RAM 10 and receives a write command, a read command, and an erase command from the host 20 to execute a predetermined process on the flash memory 3 or to control a data transfer process through the buffer 7.

ROM 9 stores, for example, control programs controlled by CPU 8. RAM 10 is used as a work area for CPU 8 to store control programs and various tables.

Figure 3:
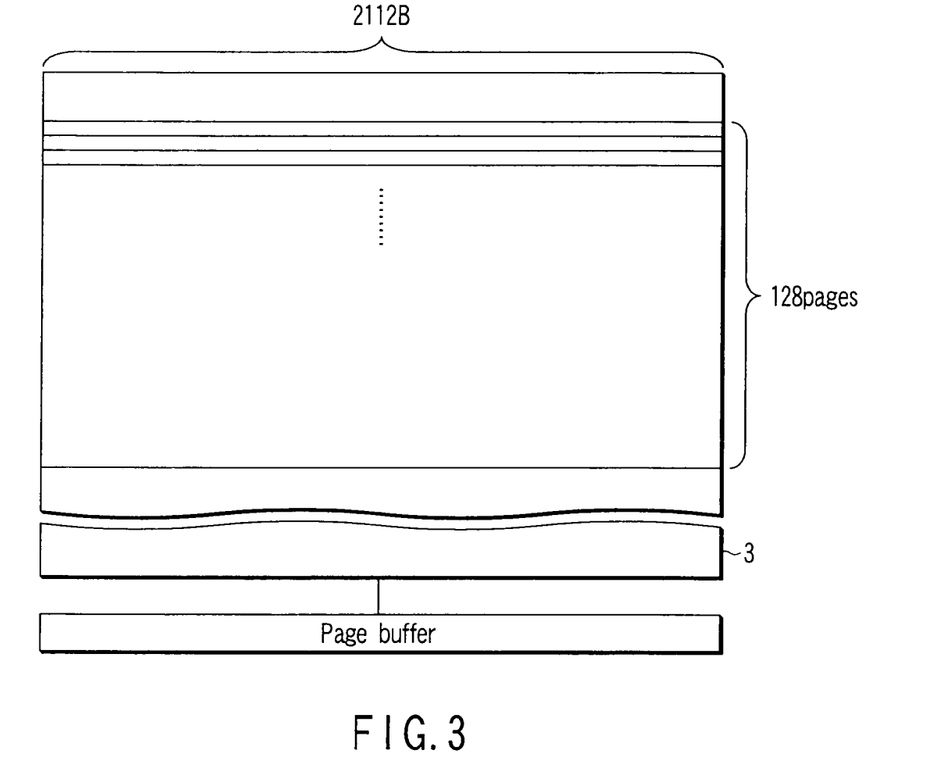
FIG. 3 is a diagram showing a data arrangement in a flash memory.

FIG. 3 is a diagram showing a flash memory (that is, the NAND type flash memory in the memory card 1) and a data arrangement. Each page (recording unit area) in the flash memory 3 has 2112 B (512 B of data storage section×4+10 B of redundant section×4+24 B of management data storage section). One erase unit (that is, 256 kB+8 kB) is composed of 128 pages. In the description below, for convenience, the erase unit of the flash memory is 256 kB.

Further, the flash memory 3 has a page buffer used to input and output data to and from the flash memory 3. The page buffer has a storage capacity of 2112 B (2048 B+64 B). During a data write operation or the like, the page buffer inputs or outputs data to or from the flash memory in one page unit, which corresponds to the storage capacity of the page memory.

To provide a practically effective memory card, the flash memory 3, shown in FIG. 3, desirably has a storage capacity of at least 1 Gbit. If the flash memory 3 has a storage capacity of, for example, 1 Gbit, it has 512 256-kB blocks.

Although FIG. 3 illustrates that the erase unit is a 256-kB block, it is effective in a practical sense to construct the flash memory whose erase unit is, for example, a 16-kB block. In this case, each page has 528 B (512 B of data storage section+ 16 B of redundant section). One erase unit (that is, 16 kB+0.5 kB (k is 1024) corresponds to 32 pages.

Regions of the flash memory in which data is written are classified into areas according to saved data. The flash memory 3 has a user data area 34, a management data area 31, a confidential data area 32, and a protective data area 33 as areas in which data is written.

The user data area 34 is an area that can be freely accessed and used by a user of the memory card 1, and stores user data.

The protective data area 33 stores important data and can be accessed only if the host 20 is validated through the mutual authentication between the memory card 1 and the host 20 connected to the memory card 1.

The management data area 31 mainly stores management information on the memory card 1 and card information on the memory card 1 such as security information and a media ID.

The confidential data area 32 is an area to which key information used for ciphering and confidential data used for authentication are saved and which can be accessed by the host 20.

A detailed description will be given below of the configuration of the memory card 1 and host 20.

[2] File System

Figure 4:
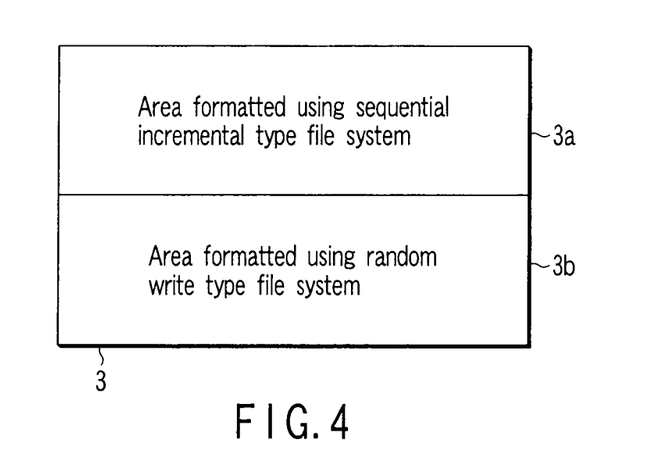
FIG. 4 is a diagram showing how the flash memory is partitioned according to different formats.

Now, the file system will be described. The NAND type flash memory in the memory card is normally in FAT format. In the present embodiment, as shown in FIG. 4, at least a part 3a of the flash memory 3 is formatted using a sequential-access incremental-write type file system. The remaining part 3b of the flash memory 3 may be formatted using a random-write type file system as described later.

With the incremental-write type file system, data is sequentially written in sectors starting from lower sector (write area) address and going to a higher sector address. In the description below, the phrase "the file system writes and reads data" and descriptions meaning this shall mean that the file system instructs the controller of the memory card to write and read data and that the controller actually writes and reads data to and from the flash memory.

The adoption of the incremental-write type file system for the memory card 1 eliminates the need for frequent data erase and rewrite operations. As a result, efficient file write and rewrite operations are expected for some applications.

Further, the application of the incremental-write type file system to the memory card 1 eliminates the need for block erasures during a file write operation. This prevents a decrease in file write speed. Furthermore, since sequential write operations are performed, extra processing for the memory card 1 such as a move accompanying write operation is not required. This is expected to increase the speed of a write process.

The sequential-access incremental-write type file system includes, for example, a universal disk format. UDF is a file system employed in DVD. With UDF, the positions (sector addresses) of file entries are described in an allocation table called information control block (ICB). ICB is provided for each file. ICB of the file is rewritten for each file update.

Figure 5:
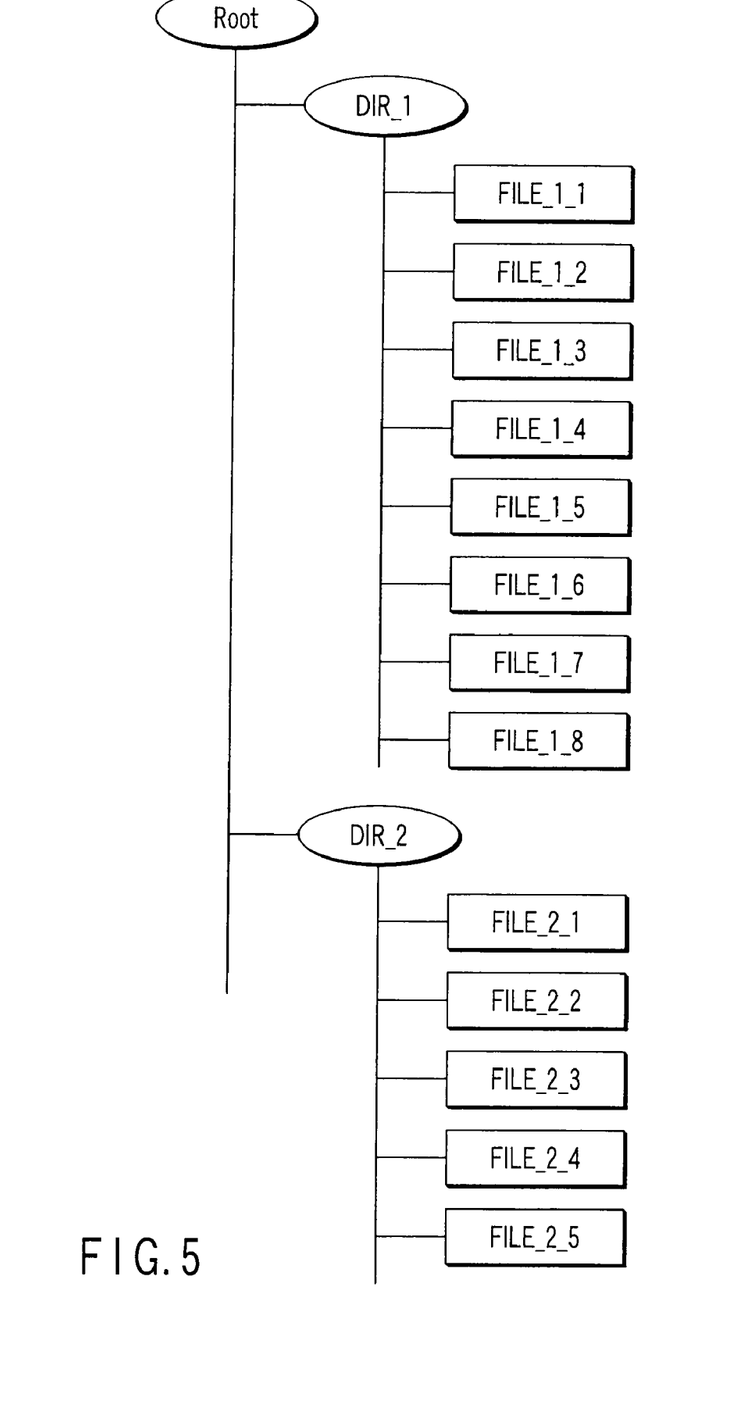
FIG. 5 is a diagram showing a common file structure.
Figure 6:
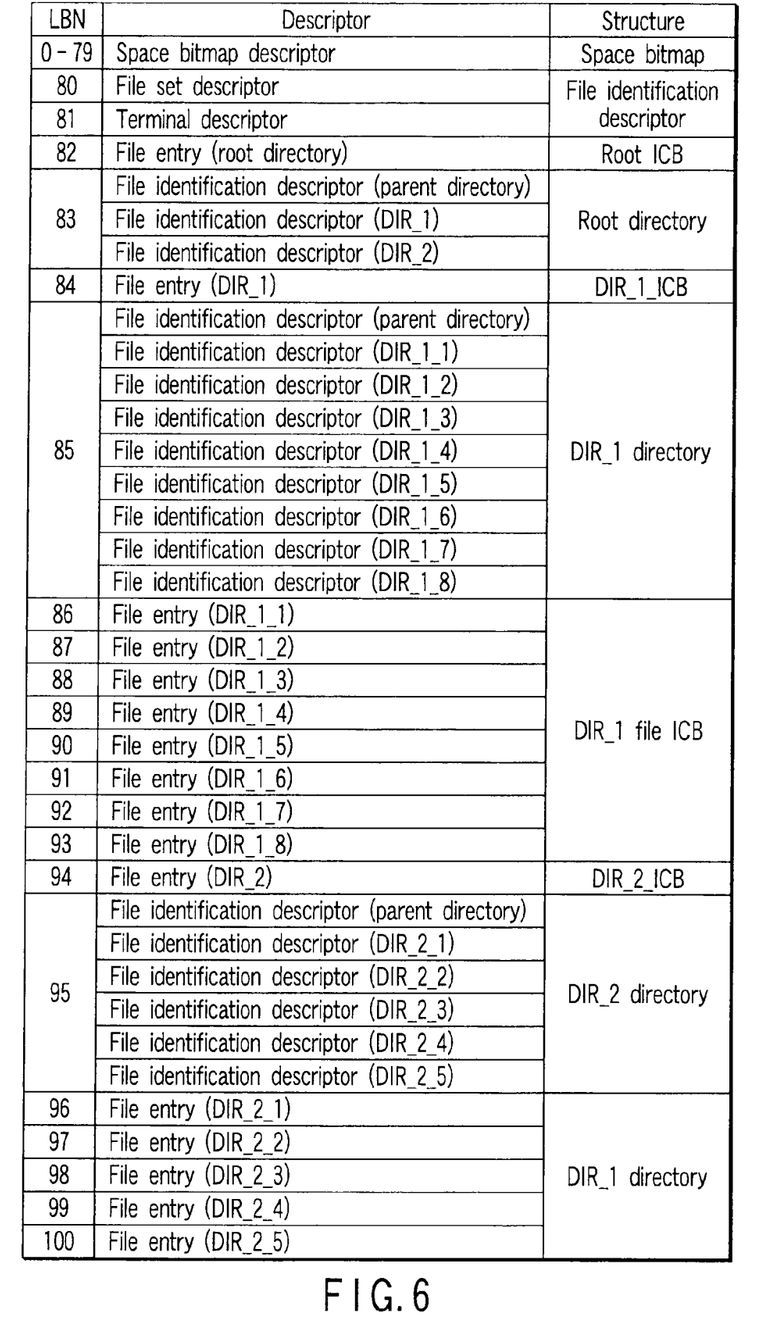
FIG. 6 is a diagram showing file configuration implemented using ICB.

The structure of ICB will be described with reference to FIG. 5. Such a configuration as shown in FIG. 6 corresponds to the file structure shown in FIG. 5 and using ICB. When a file is accessed, the address is accessed at which ICB of the file is described. The name of the file and the address of the file entry are described using file identification descriptors in ICB. The file entry includes the position of the file substance and the size and attributes of the file. Actual data of the target file is stored at the address of the file substance described in the file entry.

A similar structure is also formed if a subdirectory is provided. ICB (LBA82) of a root directory describes the address (LBA83) of a file entry of the root directory. Directory information on the root directory is described in an area specified by this addresses. The directory information includes the addresses (LBA84 and 94) of ICBs of subdirectories.

ICB of the subdirectory describes the address of ICB of each of the files of the subdirectory. As described above, the file entry of the file is described at the address described in ICB of the file. The actual (real) address is identified with reference to the file entry.

[2-1] File System Types

Standards for writable DVDs include DVD-R, DVD-RW, and DVD-RAM. The file system varies depending on the characteristics of disks. Each file system will be described below. Sequential-access additional-write operations can be performed on any of these file systems. Description will be given below of file systems that can be adopted in the present embodiment.

[2-1-1] DVD-R Type File System

With the DVD-R type file system, written data cannot be erased or rewritten. In a write operation, data are sequentially written starting from a lower sector address. Thus, the DVD-R type file system updates, erases, or adds files on the basis of additional write operations, using VAT, described later. The DVD-R type file system, which is of a incremental-write type, has a conversion table called virtual allocation table (VAT), as a file.

VAT describes the correspondences between virtual sector addresses and logical sector addresses. To access a certain address, the host 20 uses VAT to convert a virtual sector address into a logical sector address and then access the logical sector obtained.

Then, during an additional write operation, data is additionally written to a file substance, and the logical sector address in VAT is changed which corresponds to the virtual sector address of ICB of this file. Consequently, the logical sector address to be actually accessed is changed. This allows the file to be updated without the need to rewrite written sector data.

VAT is referenced when the actual (latest) address is determined from the virtual address of a file entry described using a file identification descriptor. In other words, the pointer (address) of the file substance (directory substance) described in the file entry is the real address, which need not be converted using VAT.

Further, the update of VAT itself is carried out by always writing ICB of VAT itself (VAT ICB) in the final one of written areas in a medium.

Figure 7:
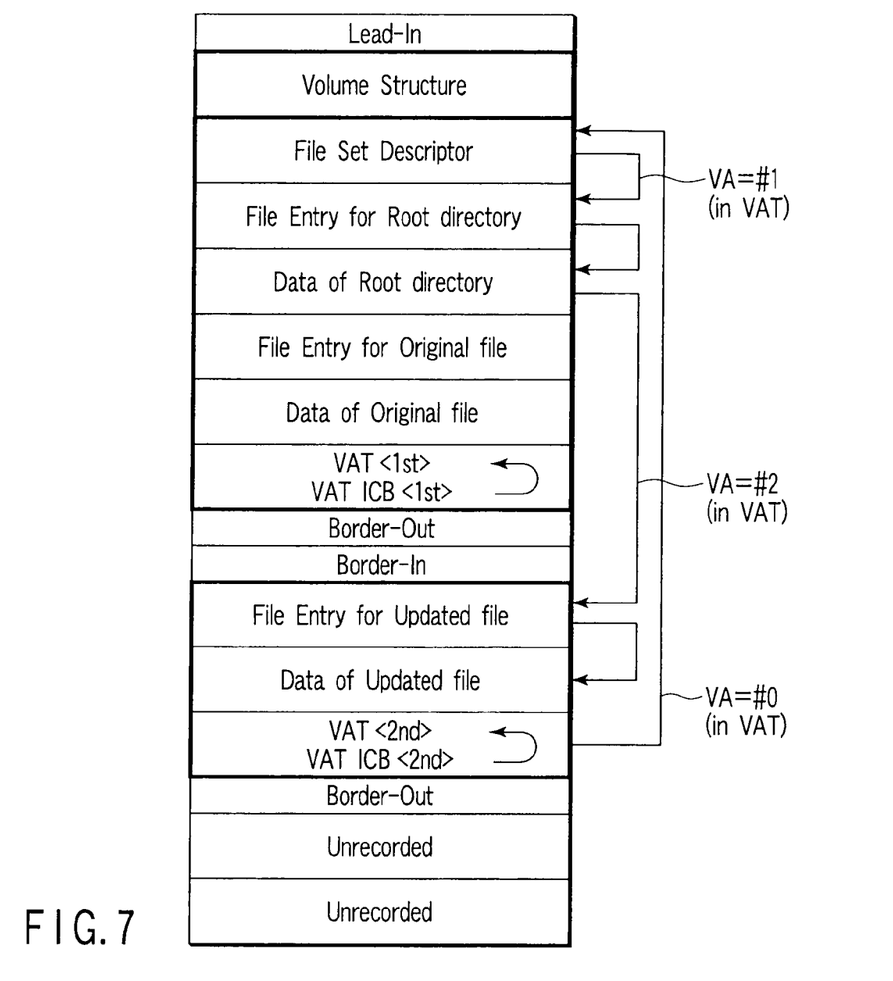
FIG. 7 is a diagram schematically showing a file structure recognized by a DVD-R file system applied to the memory card.

FIG. 7 is a diagram schematically showing a file structure recognized by the DVD-R file system applied to the memory card. FIG. 7 shows that the file has been subjected to one update, delete, or add operation.

As shown in FIG. 7, the file configuration has a volume structure, a file set descriptor, a file entry for the root directory, and data of the root directory arranged in this order from the top to bottom of the file. These are followed by a file entry for the file described during the first write operation (original file), that is, the file present before the addition, deletion. Data of the original file succeeds the file entry. The data of the original file is followed by VAT produced during the first write operation (VAT<1st>) and ICB of this VAT.

Figure 8:
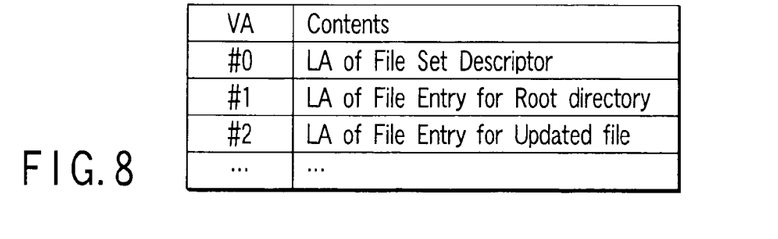
FIG. 8 is a diagram showing an example of VAT.

Following a border-in and -out areas following VAT<1st> and ICB, a file entry for the updated file and the updated file are located. The file entry and the updated file are followed by VAT produced during the update operation (VAT<2nd>) and ICB of this VAT. Following a border-out area following VAT<2nd> and ICB, a series of unwritten areas are present. FIG. 8 shows an example of VAT<2nd>. As shown in FIG. 8, virtual addresses are associated with logical addresses.

To read data from a file, the file system reads the latest VAT ICB. VAT ICB is always located at the tail end of the written areas. In the example shown in FIG. 7, VAT ICB<2nd> is accessed.

With reference to the position of the latest VAT described in VAT ICB<2nd>, the file system reads VAT. Then, the file system accesses the file set descriptor. On this occasion, the logical address of the file set descriptor is determined from a virtual address #0 using VAT.

Then, the file system reads the file entry for the root directory from the address described in the file set descriptor. Actually, the file system reads ICB and then accesses the address of the file entry described in ICB.

Then, the file system uses a virtual address #1 described in the file entry for the root directory and VAT to access the data of the root directory. Then, the file system accesses ICB of the latest file at the virtual address described in the data of the root directory. The file system then uses a virtual address #2 described in this ICB and VAT to access the file entry for the latest file. Then, the file system reads the data of the latest file from the address described in the file entry.

If the DVD-R type file system is adopted for the flash memory, it may be difficult to distinguish written areas from unwritten areas in the ordinal memory read.

Figure 9:
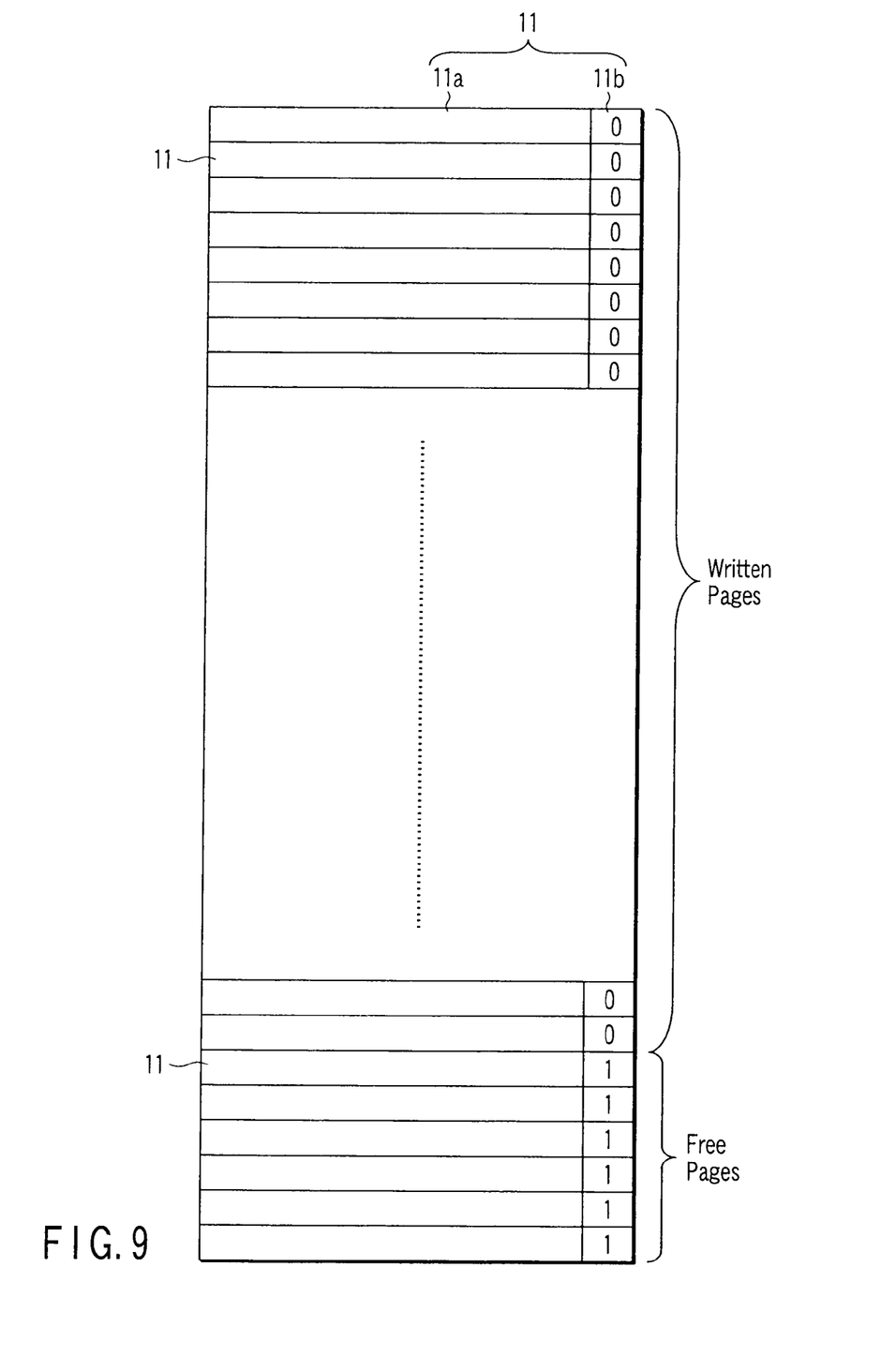
FIG. 9 is a diagram showing an example of the configuration of each page.

Thus, if the flash memory is formatted using the DVD-R type file system, each page is composed of a data storage section 11*a* and a redundant section 11*b* as shown in FIG. 9. Then, the redundant section 11*b* of each page is used as a written state information section provided with a flag indicating a written state or a free state. Checking this flag makes it possible to determine the highest page to be the "final write area".

The flag information is present in the redundant section 11*b*. Accordingly, a usual memory read command for the memory card 1 does not enable the controller 4 to read the flag information. Therefore, the memory card interface 5 is provided with a command used to load information on written areas based on the flag information.

During a write operation, the controller 4 additionally writes flags in pages together with data. However, this method can be used only for a sequential write system such as the DVD-R system. Further, to determine the final write area, the controller 4 must retrieve the pages.

The following technique may be used to efficiently retrieve the final write area. The controller checks the flags while dividing a retrieval target in the memory area of the flash memory into two one after another. That is, first, a check is performed on the flag of the redundant section of the page immediately after the boundary obtained by the first division. If this flag indicates a free state, the former half obtained by the first division is determined to be a retrieval target. Similarly, if the flag indicates a written state, the latter half obtained by the first division is determined to be a retrieval target.

Then, the new retrieval target (the first half or the second hail of the divided target) is divided into (second division). A check is performed on the flag of the redundant section of the page immediately after the boundary obtained by this division. The above operation is repeated to enable the final write area to be efficiently detected.

Further, to recognize the final write area, it is possible to, for example, provide the management data area 31 with a dedicated area in which the final write area is stored. In this case, the controller 4 need not retrieve each page in order to determine the final write area. However, block erasure must be carried out at a particular time while a write operation is being performed on the dedicated area.

As described above, with the DVD-R type file system, VAT ICB is written in the final part of the written areas. Accordingly, the final write area must be detected for an operation. By providing the flag indicating the written or free state as in the case of the present embodiment, it is possible for the controller 4 to detect the final write area in a short time.

With the DVD-R type file system, already written data cannot be erased or rewritten and data is sequentially written starting from a lower sector address as described above. Owing to this characteristic, the application of the DVD-R type file system to the flash memory precludes block erasure from occurring during a file update, additional write or delete operation. For writes, only sequential-access additional-write operations are possible.

[2-1-2] DVD-RW File System

The DVD-RW type file system performs a file update, additional write, and delete operations by rewriting sector data (ICB and the like).

With an unwritten area, the file can be updated by rewriting ICB and additionally writing data to the file substance. Without an unwritten area, written area need to be rewritten or an unwritten area must be provided by using the file system to reconfigure the files in the memory card (garbage collection).

The DVD-RW type file system is provided with a sparing area used to compensate for a bad sector resulting from repeated rewrite operations because only a small number of rewrite operations can be performed on DVD-RW. If a bad sector occurs, the sparing table is used to change an access to the bad sector to one to the sparing sector. The DVD-R type file system supports such a conversion mechanism. The DVD-RW type file system carries out sparing in packet units.

On the other hand, the controller normally manages bad sectors in the memory card. If the DVD-RW type file system manages the files in the flash memory 3, it becomes unnecessary to manage bad sectors using the controller 4. This makes it possible to reduce a burden on the controller 4.

[2-1-3] DVD-RAM Type File System

Like DVD-RW, a DVD-RAM type file system performs a file update, additional write, or delete operation by rewriting sector data (ICB and the like). The DVD-RAM type file system executes other processes in almost the same manner as that in which DVD-RW performs the processes. However, a large number of, specifically, about 100,000 rewrite operations can be performed on DVD-RAM. Consequently, this file system does not support the means for providing spares for bad sectors using the sparing area and sparing table.

A large number of rewrite operations can be performed on the flash memory as in the case of DVD-RAM. Further, the controller 4 generally manages bad sectors in the memory card. Accordingly, in general, the DVD-RAM type file system is more suitable for memory cards.

[2-2] Setting of File System

Now, description will be given of criteria used to set (select) an appropriate file system.

[2-2-1] Setting of File System Based on Capacity

The memory card can be efficiently used by setting the appropriate file system depending on applications or conditions. The appropriate file system will be described below.

If the memory card 1 has a large capacity, it is preferable to adopt a file system such as UDF which can deal with sequential write media. As described above, UDF has three types of file systems. Any of the file systems is preferably adopted depending on the capacity of the memory card 1.

For a large capacity, a file system such as the DVD-R system is preferably adopted which can deal with sequential write media.

For a large capacity with a relatively small size, it is preferable to employ a file system such as the DVD-RW system or DVD-RAM system which is based on rewritable media.

If the memory card 1 has a small capacity, the current FAT file system is preferably used. With a write-one type file system such as UDF, repeated file updates increase unavailable written areas. Garbage collection is required to reduce the unavailable areas to provide free areas. A smaller capacity requires garbage collection to be frequently carried out. This may impair the convenience of the memory card. Further, UDF has a larger management information area than FAT and is also unsuitable for small-capacity memory cards in this regard.

[2-2-2] Setting of File System Based on Applications

It is preferable to employ a file system such as a FAT file system which is based on random rewritable media, for applications involving a small file size or frequent file rewrite operations (common office data file applications such as mails and documents).

A file system such as UDF which can deal with sequential write media is preferably adopted for applications involving a large file size and infrequent updates of the same file (multimedia such as images, music, or motion pictures)

It is preferable to adopt a file system such as the DVD-R system which is based on media allowing only additional write operations, for applications involving the recording of motion pictures.

It is preferable to adopt a file system such as the DVD-RW or DVD-RAM system which is based on rewritable media, for applications involving the recording of music or still images.

[2-2-3] Method for Setting File System

Possible methods for setting a file system include the following.

The host automatically determines the file system.

The user can change the file system (the host sets the appropriate one by default)

The card is preset in a format suitable for a particular application before shipment (the format can be changed later).

Note that one memory card may be divided into some partitions, each of which is managed by a file system suitable for a particular application or the like. For example, the management data area 31 is frequently updated owing to the presence of a management data block in this area. Accordingly, the management data area 31 is preferably managed by the FAT file system.

Further, the UDF or FAT file system may be set for the protective data area or user data area depending on the capacity or application. Some of areas (partitions) may be set for the protective data area or user data area so that a file system (FAT or UDF) corresponding to a particular application can be set for each partition.

Figure 10:
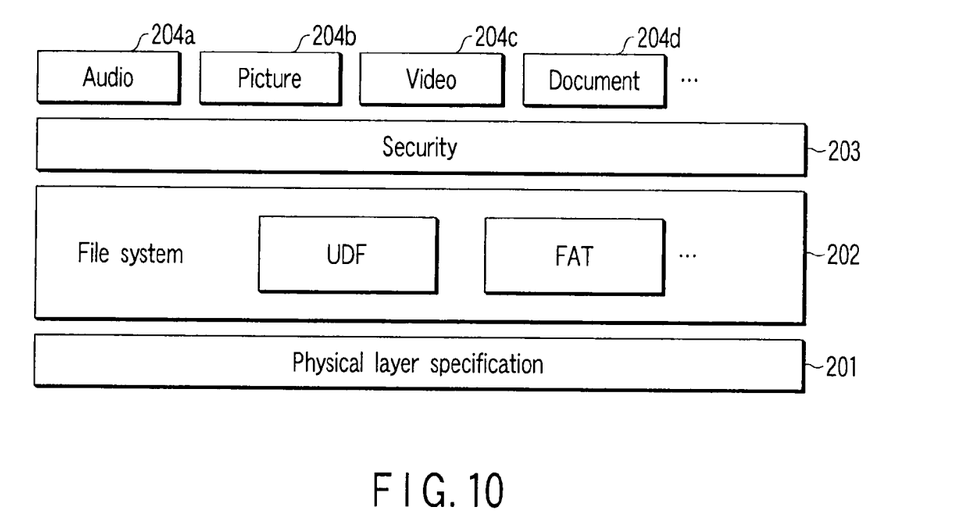
FIG. 10 is a diagram showing an example of the configuration of specification of the memory card.

Such a specification as shown in FIG. 10 is used to allow different file systems to coexist in the memory card 1. FIG. 10 is a diagram showing the configuration of the specification of the memory card 1. A physical layer specification 201 specifies a shape, an electric interface, commands, and the like. A file system 202 specifies that a plurality of file systems (UDF and FAT) can coexist. A security 203 specifies matters on security. Applications such as an audio 204a, a picture file 204b, a video 204c, and a document 204d are specified above the security 203.

According to the present embodiment, a partition table is described in, for example, the leading sector of the memory card 1 so that the host 20 can recognize the file system for each partition.

The partition table describes the following information.
1. Boot flag
2. Information on the start sector of the partition
3. Area information (file system (format) information)
4. Partition area information If the host 20 sets format information in a dedicated area in the memory card, file system information may be set in this area together with information on the memory area in the memory card 1.

[2-3] Memory Control System inside Memory Card Corresponding to File System

If a plurality of file systems are set in the memory card 1, it is preferable to vary a system for controlling a write/read process on the flash memory 3, depending on the file system.

[2-3-1] Case of FAT

For the FAT file system, a memory control system is used which has been used for the FAT file system. That is, the memory card 1 executes special processes (write acceleration, FAT caching, directory caching, and the like) when a move accompanying write operation is performed or when the FAT file system is utilized as described later.

<Move Accompanying Write>

If a write (update) operation is attempted on a written page in the flash memory, a move accompanying write process is executed as described below. In the flash memory, erasure is executed on every block, thus requiring the following process.

1) One erased block (B) is prepared.
2) The data in all the written pages in a block (A) except a rewrite target is copied to a block (B), the block (A) containing the rewrite target page.
3) The data of the rewrite target page is written to the block (B).
4) The logical address of the block (A) is replaced with that of the block (B).

<FAT Cache and Directory Cache>

In the FAT file system, FAT is often present at determined logical addresses and directory management information is often present in specified logical address areas.

The FAT file system frequently rewrites the FAT or directory management information. This means that the data at the same logical address is frequently rewritten.

In the flash memory, the rewrite of the data at the same address involves a move accompanying write operation and thus reduces a data update speed. Further, the lifetime of the flash memory may be shortened by frequent operations of writing data at the same physical address.

Thus, some physical address areas are provided for the page at each logical address in an area covering a predetermined range so that when a write operation is performed on the page at the logical address in the area, the operation is sequentially performed at the plurality of physical addresses. This prevents a decrease in write speed and in the lifetime of the memory. This technique is called FAT caching or directory caching.

FAT includes FAT16 and FAT32. FAT16 differs from FAT 32 in the sizes and positions of the FAT and directory. Thus, the memory card 1 may determine whether FAT is FAT16 or FAT32 so as to change the area of logical addresses in the memory card 1 to be subjected to FAT or directory caching as well as the size of a reserved area for caching, depending on whether FAT is FAT16 or FAT32.

[2-3-2] Case of UDF (DVD-R, RW, and RAM file systems)

With the DVD-R type file system, a file update, additional write, and delete operations triggers no block erasure, and write operations are performed on an additional, sequential basis. Thus, the memory card 1 does not perform the move accompanying write operation or any special processes such as the one executed for the FAT file system. The memory card 1 does not provide any memory area required for the special process.

With the DVD-RW type file system, block erasure is required for a file update, additional write, and delete operations. Thus, the file system must carry out sparing sector management during a rewrite operation. The memory card 1 does not perform any special processes such as those for the move accompanying write operation and the FAT file system. The memory card 1 does not provide any memory areas required for the special processes.

As described above, the sparing mechanism in the DVD-RW type file system executes sparing on every packet. The packet is presently 16 kB in size. This size is much smaller than that of the size of each block (erase unit) in the current flash memory. Thus, in view of efficiency, the memory card is often responsible for the process of sparing bad sectors in many case.

However, if each block in the flash memory is small (for example, equal to or smaller than the packet size), the file system may take the responsibility for the sparing of bad sectors. The file system uses the sparing area and sparing table to manage the sparing of bad sectors. In this case, the memory card 1 does not provide any sparing blocks.

With the DVD-RAM type file system, block erasure is required for a file update, additional write, and delete operations. Further, the file system does not carry out sparing sector management but the controller 4 performs this task as in the case of the prior art. The memory card 1 does not perform move accompanying write operation or any special processes such as those for the FAT file system. The memory card 1 does not provide any memory areas required for the special processes.

Further, with DVR-RW or DVD-RAM type UDF, the data in a fixed logical address area called a volume structure is relatively frequently rewritten. Therefore, if the DVD-RW or DVD-RAM type file system is set, the memory card may execute rewrite accelerating process similar to FAT caching on this logical address area.

However, the target logical address area, rewrite unit, and rewrite frequency in this case are different from those for FAT caching. Accordingly, the logical address area to undergo caching and the size of the reserved area for caching are changed.

As described above, by avoiding unwanted processes and the provision of unwanted memory areas, it is possible to prevent a decrease in processing time and user data area 3 in the memory card 1.

[2-3-2] Identification of File System by Controller

The controller 4 must identify the file system in order to change the memory control system depending on the file system. An embodiment of an identification method will be shown below.

The file system is identified on the basis of format information (for example, file system information in the partition table). This identification method does not require that the host 20 perform any special operations but requires that the controller 4 can recognize the format information to determine the type of the format.

A format information setting area is provided in the flash memory 3. Further, the host sets identification information. This identification method does not require the memory card 1 to recognize format data.

[3] Memory Area Moving Command

Figure 11:
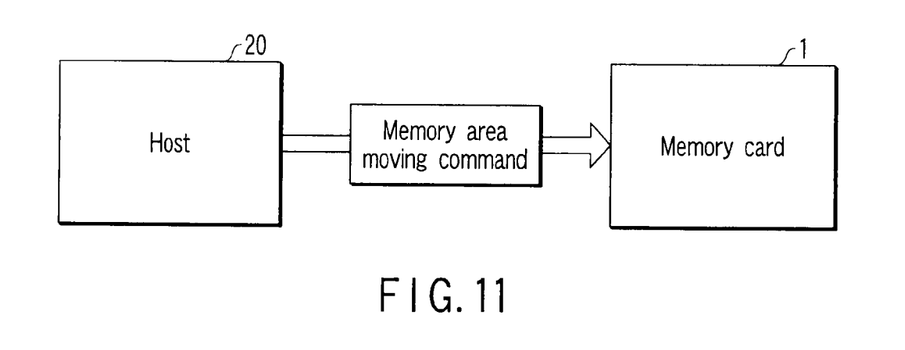
FIG. 11 is a diagram showing a memory area moving command.

As shown in FIG. 11, a "memory area moving command (data moving command)" or (and) a "block moving command" is preferably provided for the interface between the memory card 1 and the host 20. The use of these commands makes it possible to execute garbage collection and a deflag process in accordance with instructions from the host 20. Possible methods will be described below by which the memory card 1 can efficiently execute a process specified by the memory area moving command.

A first method is to utilize a conversion table for conversions between virtual addresses (logical addresses) and physical addresses. The controller 20 rewrites the conversion table so that the host 20 can recognize that data to be moved is stored in the storage area at the page address resulting from the movement specified by the area moving command. That is, an apparent state is created which causes the host 20 to recognize that the data has been moved. If the data movement commanded by the memory area moving command involves the data movement in a block unit, only a change in the conversion table is made but actual memory movement is not carried out to realize the data movement in units of a block.

A second method is to use a page copy command of the flash memory inside the card to actually move the data, in response to the memory area moving command.

A third method is to combine the above two methods.

Alternatively, the block moving command may be provided in the interface between the memory card 1 and the host 20. This command contains an instruction on movement of every block of data in the memory card and is a kind of memory area moving command. Memory card 1 can carry out any of the same three methods as the ones to achieve the memory area moving command to efficiently execute a process specified by the block movement command.

Intrinsically, the DVD-R type file system cannot update or erase data. The DVD-R type file system performs control such that, during a write operation, a file is sequentially written in consecutive free areas succeeding written areas. Thus, this file system recognizes that the consecutive free areas succeeding the written areas are writable areas.

Figure 12:
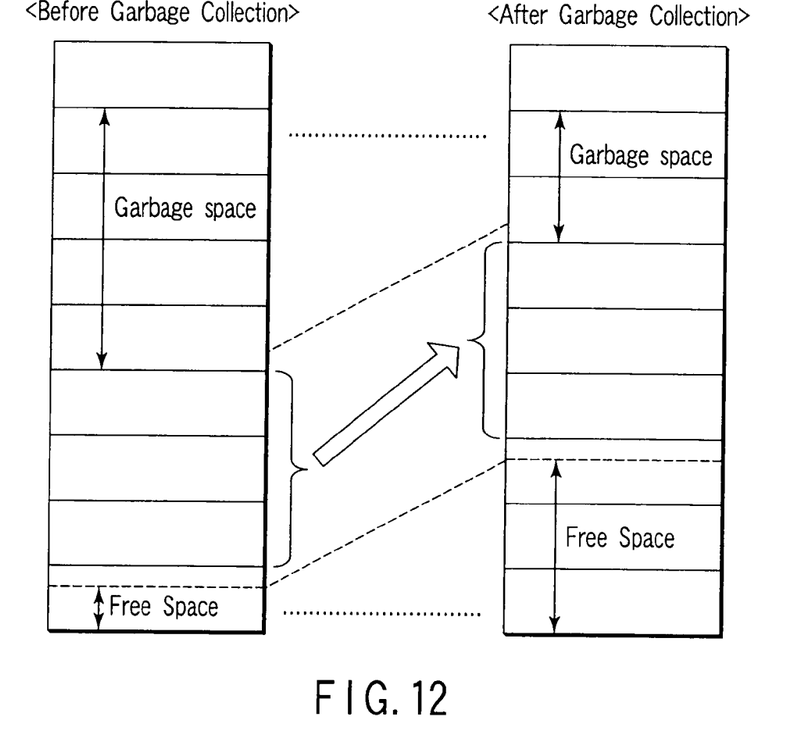
FIG. 12 is a diagram showing a file structure before and after garbage collection.

On the other hand, in the flash memory, data can be updated and erased. Thus, as shown in the left of FIG. 12, there may be a block to which old data, that is, data that is unwanted because of the latest data written in other blocks, has been written. In this case, the DVD-R type file system does not recognize that the block in which the old data has been written is a writable area. Thus, it is desirable to provide a technique for allowing the DVD-R type file system to recognize that such a block is a rewritable area.

A possible such method is to carry out garbage collection as shown in the right of FIG. 12. That is, areas in which old data has been written (garbage areas) are erased in block units. Then, blocks in which valid data has been written and which correspond to the erased blocks are moved to blocks at lower addresses. As a result, the number of unwritten areas increases.

If the file system moves the blocks in which the valid data has been written, it must read data from each of the blocks and write the data to the destination block. Consequently, the block moving command is provided which the memory card 1 receives and executes a moving process. This allows the data move by only changing the block logical addresses and the physical block addresses in the memory card 1 without actually moving data to efficiently carry out the garbage collection.

The block moving command allows the host 20 to easily instruct the memory card 1 to execute the block moving process.

Of course, the garbage collection requires the host 20 to rewrite the management information such as ICB and VAT.

During the garbage collection, if the block moving command is used to move a block, a garbage area in page units may be left as shown in the right of FIG. 12. To avoid this, the memory area moving command may be used to carry out movement in page units. Note that the controller 4 can use a page copy command, which the flash memory 3 equip and is used to ask the flash memory 3 to carry out a copy between the pages, to efficiently move data between the pages.

Further, the techniques described in this section are applicable not only to the garbage collection for UDF but also deflagging for FAT or the like.

The use of the memory area moving command or block moving command improves the processing speed of the garbage collection and deflag process.

[4] Addition of UDF Specification and Definition of Parameters in Accordance with Qualities of Flash Memory Logical format parameters for the file system preferably include not only the sector size and the packet size, which is a write unit, but also the block (erase unit) size of the flash memory 3. This enables the file system 20 to manage files in accordance with the erase characteristic of the flash memory 3. When the file system 20 knows the block size of the flash memory 3, the following process is possible.

First, if the DVD-RW type file system is adopted, the file system preferably manages the sparing table and sparing area on the basis of the block size written in the logical format parameters. That is, in view of efficiency, the size of a managed unit for the sparing table and sparing area is preferably the same as that of each block in the flash memory. This eliminates the need to provide sparing blocks in the memory card, thus preventing an initial decrease in user area.

Further, preferably, the utility and file system of the host 20 preferentially carry out the garbage collection and deflagging in block units.

In the garbage collection and deflagging, data is frequently moved from a written block to another block. Carrying out this in block units enables the process to be executed efficiently. Further, in this case, the use of the "memory area moving command" enables the process to be executed more efficiently.

Further, preferably, the file system of the host 20 preferentially describes all ICBs of the file in one block. This makes it possible to minimize the number of blocks rewritten when each ICB is rewritten in connection with the garbage collection. This improves the data movement and ICB rewrite operations to be more efficiently performed during the garbage collection or deflagging.

[5] Recovery Process

[5-1] Recovery Process I

Description will be given of a method of recovering a stream file if an operation for writing the stream file in real time has not been completed.

First, in a file write operation, the host 20 sequentially writes a file using the following procedure. With reference to the flowchart in FIG. 13, description will be given of the procedure for writing a file.

Figure 13:
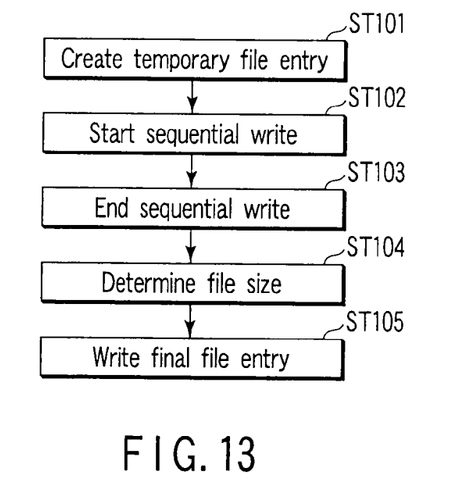
FIG. 13 is a flowchart showing a write process executed on the memory card.

The host 20 creates a temporary file entry (step ST101). The file size described in the temporary file entry (temporary file size) is set sufficiently large regardless of the size of an area that will be actually occupied by the written file. The temporary file size is set at a sufficiently large value, for example, the value for the capacity of all the free areas. The temporary file entry also describes the address of the start position of the file.

The host 20 sequentially writes the file starting from the start position of the file in the free areas set in the temporary file entry and going from lower sector to higher sector (step ST102). During the write operation, the memory card 1 utilizes the redundant areas of pages to record the flag indicating the written state or free state.

Once the operation of writing the stream file in real time is finished (step ST103), the host 20 determines the actual file size (step ST104). On the basis of the file size determined, the host 20 writes the final file entry again (step ST105). For the DVD-R system, the file entry and VAT ICB are additionally written. For the DVD-RAM, -RW system, the temporary file entry is changed to the final one based on the final file size.

If the file write operation has not been completed owing to any factor (hardware problem such as an exhausted battery), the host 20 recovers the file using the following procedure. The procedure of the recovery process will be described with reference to FIG. 14.

Figure 14:
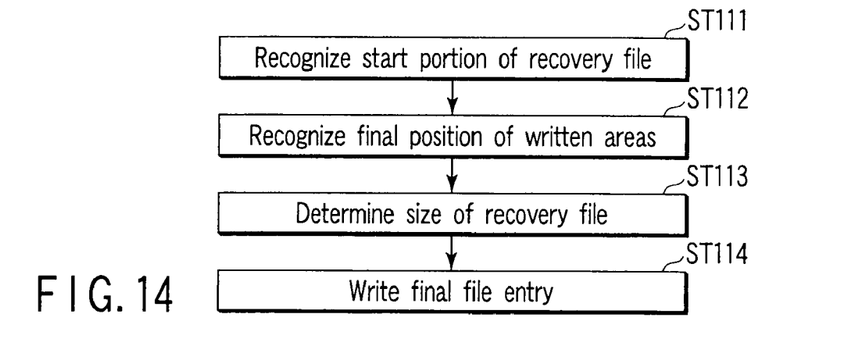
FIG. 14 is a flowchart showing a process of recovering a file written to the memory card.

The host 20 references the temporary file entry to recognize the start position of the file (step ST111).

The host 20 then references the flag indicating the written state or free state to recognize the final write position in the written areas (step ST112).

The host 20 determines the area from the start position of the file to the final write position to be the size of the recovery file (step ST113). Then, as in the case of step ST105, the host 20 writes the file entry again on the basis of the recovery file size determined (step ST114).

Such a write and recovery processes enable a stream file to be recovered up to a position where recording of the file has been finished even if the write operation has not been completed, resulting in an incomplete file structure. Photographing of motion pictures with a video camera is an example in which a stream file is written in real time.

[5-2] Recovery Process II

Now, description will be given of a recovery method to which the above recovery process is applied and which is used if an operation of writing a stream file in real time using the FAT file system has not been completed.

The host 20 writes the file using the procedure described below. The procedure of the write process will be described with reference to the flowchart in FIG. 15.

Figure 15:
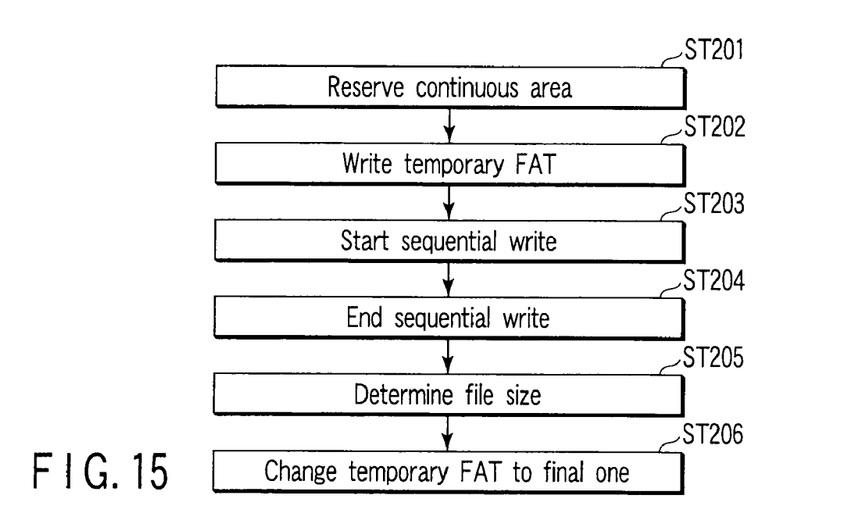
FIG. 15 is a flowchart showing a write process executed on the memory card.

For preparation, the host 20 carries out deflagging or the like to provide a sufficiently large continuous free area in which the file is to be written (step ST201). If a sufficiently large continuous free area is already present, this process will not need to be executed. In order to evenly write the file in each cluster, the memory card 1 changes the conversion table for conversions between logical addresses and physical addresses. The conversion table may be changed so that the logical addresses in the free area are consecutive.

The host 20 writes a temporary FAT for the file to be written (step S202). On this occasion, the host 20 writes such FAT as indicates that the write area is a sufficiently large continuous area, on the assumption that the file will be written in the provided continuous area.

The host 20 sequentially writes the file starting from lower sector and going to higher sector (step ST 203). To prevent a decrease in write speed caused by block erasure, the update of FAT is not carried out during the write operation. During the write operation, the memory card 1 records the flag indicating the written state, in the redundant section of the written page.

Once the operation of writing the stream file in real time has been finished (step ST204), the host 20 determines the file size (step ST205). On the basis of the file size determined, the host 20 changes the temporary FAT to the final one and then closes the file (step ST206).

If the file write operation has not been completed owing to any factor (hardware problem or the like), that is, the final FAT write operation has not been completed, then the host 20 recovers the file using the following procedure. The procedure of the recovery process will be described with reference to FIG. 16.

Figure 16:
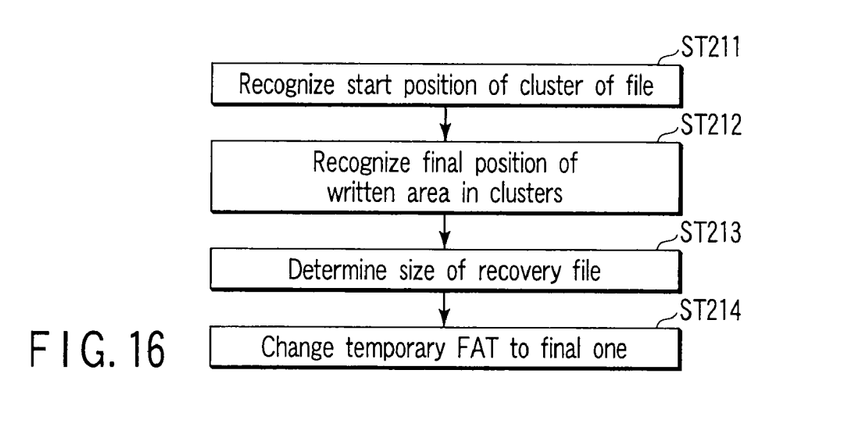
FIG. 16 is a flowchart showing a process of recovering a file written to the memory card.

The host 20 references the temporary FAT to recognize the start position of the clusters of the file (step ST211).

The host 20 then references the flag indicating the written state or free state to recognize the final write position in the written areas (step ST212).

The host 20 determines the area from the start position of the clusters of the file to the final position in the written areas to be the size of the recovery file (step ST213).

On the basis of the file size determined, the host 20 updates the temporary FAT to the final one (step ST214).

Such a write and recovery processes enable a stream file to be recovered up to a position where recording of the file has been finished even if the write operation has not been completed, resulting in an incomplete file structure. Photographing of motion pictures with a video camera is an example in which a stream file is written in real time.

Note that the write area provided in advance in step ST201 is desirably one large continuous area in terms of write control efficiency. However, even if one large continuous area cannot be provided, a some consecutive areas may be provided. Then, in step ST202, FATs are written which correspond to the plurality of consecutive areas. In step ST203, the data is sequentially written in the areas in accordance with FATs. This method degrades the write control efficiency compared to the use of one continuous area. However, this method gives the advantage of eliminating the need for the deflag process in step ST201.

[6] Setting of Write Disabled Pages

The controller 4 can set partly write disabled areas in the flash memory 4 (an address specified write protect command is already defined for a memory cards such as an SD™ card).

With an incremental-write type file system, once a file write operation is finished, the host 20 set write protection for written areas so that these areas cannot be rewritten.

A file precluded from being rewritten can be restored without being deleted or rewritten by subsequent accesses from the memory card 1. That is, the file can be protected. Further, the file can be subjected to an update or addition operation in unprotected areas. With the conventional FAT file system, when a FAT area is precluded from being rewritten in order to protect the file, FAT cannot be updated. As a result, none of the files can be subjected to an update or addition operation. This prevents the effects of the address specified write protect from being sufficiently provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for controlling a memory card which includes a nonvolatile semiconductor memory whose memory area includes a plurality of write areas, the method comprising:
   formatting a first area which is a part of the plurality of write areas in accordance with management executed by a first file system which sequentially writes data along a direction in which addresses of the plurality of write areas increase; and
   formatting a second area which is a part of the plurality of write areas in accordance with management executed by a second file system which writes data in an order which does not depend on the addresses;
   creating a temporary file entry describing a size of a reserved region which is at least a free part of the plurality of write areas and a start position of the reserved region;
   writing a file of a plurality of data in the reserved region from the start position after creating the temporary file entry; and
   when the file has been completely written, determining a size of the file written and writing a final file entry describing the start position and the size of the file by writing the final entry based on the determined size of the file or overwriting the temporary file entry as the final file entry based on the determined size of the file; and
   when the file has not been completely written, referencing the temporary file entry to recognize the start position;
   detecting a final position in the reserved region, in final position data partly constituting an unfinished file which is a part of the file being written;
   determining a size of the unfinished file using the start position and the final position; and
   changing the temporary file entry to a final file entry describing the start position and the size of the unfinished file.

2. The method according to claim 1, wherein sequentially writing data along a direction in which addresses of the plurality of write areas increase includes continuously writing data in the plurality of write areas having consecutive addresses.

3. The method according to claim 1, wherein the first file system is one of a DVD-R type file system, a DVD-RW type file system, and a DVD-RAM type file system, and
   the second file system is a FAT file system.

4. The method according to claim 1, wherein a host into which the memory card is inserted sets the first area in accordance with the management executed by the first file system and sets the second area in accordance with the management executed by the second file system.

5. The method according to claim 1, wherein the first area includes an region which a user can use, and the second area includes an region in which management information in the nonvolatile semiconductor memory is stored.

6. The method according to claim 1, wherein a data erasure is performed in units of erase areas each having a plurality of write areas in the nonvolatile semiconductor memory, and
   the first file system recognizes a size of the plurality of erase areas and manages data taking the erase area into account.

7. The method according to claim 1, further comprising:
   writing a partition table in the leading write area of the write areas, the partition table including information describing the leading write areas of the write areas in each of the first and second write areas and file system type of each of the first and second write areas.

8. The method according to claim 1, wherein the reserved region consists of a plurality of write areas having consecutive addresses, and
   writing the file in the reserved region includes continuously writing data constituting the file in the plurality of write areas having consecutive addresses, along a direction in which the addresses increase.

9. The method according to claim 1, wherein each of the plurality of write areas has a data storage section which stores data and a written state information section which indicates a written state or a free state, and
   writing the file in the reserved region includes writing data in the data storage section of one of the plurality of write areas and writing a written state indication in the written information section, and
   detecting the final position includes referencing the written state information section to detect the final position.

10. A method for controlling a nonvolatile semiconductor memory whose memory area includes a plurality of write areas, the method comprising:

using a first control method to control the nonvolatile semiconductor memory when writing or reading data to or from a first area which is a part of the plurality of write areas, the first area being formatted in accordance with management executed by a first file system which sequentially writes data along a direction in which addresses of the plurality of write areas increase;

using a second control method to control the nonvolatile semiconductor memory when writing or reading data to or from a second area which is a part of the plurality of write areas, the second area being formatted in accordance with management executed by a second file system which writes data in an order which does not depend on the addresses;

creating a temporary file entry describing a size of a reserved region which is at least a free part of the plurality of write areas and a start position of the reserved region;

writing a file of a plurality of data in the reserved region from the start position after creating the temporary file entry; and when the file has been completely written, determining a size of the file written and writing a final file entry describing the start position and the size of the file by writing the final entry based on the determined size of the file or overwriting the temporary file entry as the final file entry based on the determined size of the file; and when the file has not been completely written, referencing the temporary file entry to recognize the start position;

detecting a final position in the reserved region, in final position data partly constituting an unfinished file which is a part of the file being written;

determining a size of the unfinished file using the start position and the final position; and changing the temporary file entry to a final file entry describing the start position and the size of the unfinished file.

11. The method according to claim 10, wherein the first file system is one of a DVD-R type file system, a DVD-RW type file system, and a DVD-RAM type file system, a data erasure is performed in units of one of a plurality of erase areas each having a plurality of write areas, and the first control method includes avoiding copying data in one of the plurality of erase areas to another one of the plurality of erase areas.

12. The method according to claim 10, wherein each of the plurality of write areas has a data storage section which stores data and a written state information section which indicates a written state or a free state, and a controller which controls the nonvolatile semiconductor memory writes data to the data storage section of one of the plurality of write areas and writes a written state indication in the written state information section.

13. The method according to claim 12, wherein the written state information section is used to detect one of the plurality of write areas in which data is written.

14. The method according to claim 10, wherein each of write areas includes a data storage section which stores data and a written state information section which indicates a written state or a free state, the method further comprises to sequentially write data in the plurality of write areas in a direction in which addresses of the plurality of write areas increase, while writing data in the data storage section of one of the plurality of write areas and writing a written state indication in the written state information section.

15. The method according to claim 13, wherein sequentially writing data in the plurality of write areas along a direction in which addresses of the plurality of write areas increase includes continuously writing data in the plurality of write areas having consecutive addresses.

16. The method according to claim 10, further comprising:

writing a partition table in the leading write area of the write areas, the partition table including information describing the leading write areas of the write areas in each of the first and second write areas and file system type of each of the first and second write areas.

17. The method according to claim 10, wherein the reserved region consists of a plurality of write areas having consecutive addresses, and writing the file in the reserved region includes continuously writing data constituting the file in the plurality of write areas having consecutive addresses, along a direction in which the addresses increase.

18. The method according to claim 10, wherein each of the plurality of write areas has a data storage section which stores data and a written state information section which indicates a written state or a free state, and writing the file in the reserved region includes writing data in the data storage section of one of the plurality of write areas and writing a written state indication in the written information section, and detecting the final position includes referencing the written state information section to detect the final position.

* * * * *